(12) United States Patent
Li

(10) Patent No.: US 6,962,413 B1
(45) Date of Patent: Nov. 8, 2005

(54) AUXILIARY FRAME FOR SPECTACLES

(76) Inventor: Xin Liang Li, 2300 S. Reservoir St., #401, Pomona, CA (US) 91766

( * ) Notice: Subject to any disclaimer, the term of this patent is extended or adjusted under 35 U.S.C. 154(b) by 0 days.

(21) Appl. No.: 10/935,775

(22) Filed: Sep. 7, 2004

(51) Int. Cl.[7] .............................................. G02C 9/00
(52) U.S. Cl. ......................................... 351/47; 351/57
(58) Field of Search ............................. 351/47, 57, 48, 351/58, 44, 41, 158

(56) References Cited

U.S. PATENT DOCUMENTS

| | | | | |
|---|---|---|---|---|
| 1,620,569 | A * | 3/1927 | Quick .......................... | 351/47 |
| 6,012,811 | A * | 1/2000 | Chao et al. .................... | 351/47 |
| 6,540,348 | B1 * | 4/2003 | Xie ............................ | 351/57 |
| 6,637,879 | B1 * | 10/2003 | Xiao ........................... | 351/47 |
| 6,695,448 | B2 * | 2/2004 | Xiao ........................... | 351/57 |

* cited by examiner

*Primary Examiner*—Hung Xuan Dang
(74) *Attorney, Agent, or Firm*—Raymond Y. Chan; David and Raymond

(57) ABSTRACT

An auxiliary frame for detachably mounting in front of a spectacle frame includes a mounting frame and a retention arrangement. The mounting frame supports two shelter lenses for detachably mounting on a spectacle bridge. The retention arrangement includes two guiding members and two urging members. The two guiding members are rearwardly extended from two inner sides of the shelter lenses respectively and defined a guiding distance between the two guiding members which is smaller than the lens distance of the spectacle frame. The two urging members define an urging distance which is larger than the lens distance of the spectacle frame, such that when the guiding members are extended at the two inner sides of the spectacle lens respectively, the two urging members are adapted for applying an urging force against the two inner sides of the spectacle lens respectively.

21 Claims, 5 Drawing Sheets

AUXILIARY FRAME FOR SPECTACLES

BACKGROUND OF THE PRESENT INVENTION

1. Field of Invention

The present invention relates to spectacles, and more particularly to an auxiliary frame for spectacles which comprises a retention arrangement adapted to securely retain the auxiliary frame in position on the spectacles.

2. Description of Related Arts

Auxiliary shelter frames are widely used nowadays. A conventional auxiliary shelter frame, such as clip-on sunglasses, comprises a plurality of clipping claws for detachably mounting on shortsighted or farsighted primary eyeglasses so that the wearer does not need to carry and pay for another pair of shortsighted or farsighted sunglasses. However, the metal made clipping claws may scratch the lenses of the primary eyeglasses during the mounting process.

Moreover, the auxiliary shelter frame may not be able to be securely mounted on the primary eyeglasses so that when the wearer's body is in active body movement, such as during a particular outing, the auxiliary shelter frame may fall off from the primary eyeglasses. In some unfortunate occasions, the auxiliary frame may be distorted or damaged or slightly scratched during the unintentional drop.

In order to resolve the scratching, magnetic attachments have been developed for auxiliary shelter frames so that attachment between the auxiliary shelter frame and the corresponding eyeglasses is by virtue of non-destructive magnetic force. Typically, a primary pair of magnet members is affixed on two upper side extensions of a primary spectacle frame respectively. An auxiliary shelter such as eyeglasses comprises a pair of arms for supporting on the upper side extensions for preventing the auxiliary shelter frame from moving downward relative to the primary spectacle frame, and an auxiliary pair of magnet members connected to the arms respectively for engaging with the primary magnet members of the primary spectacle frame so as to stably attach the auxiliary shelter frame to the primary spectacle frame.

The problem for this conventional art is that the wearer has to align two pairs of magnet members. If the auxiliary magnet members of the sunglasses are misaligned with the primary magnet members of the primary spectacle frame, the sunglasses will still fall down from the primary spectacle frame very easily.

Moreover, a major drawback of the eyeglasses equipped with the magnet attachment is that the primary spectacle frame needs to be altered in its original structure design so as to affix the magnet members thereon. So, inevitably, the wearer may have to buy a spectacle set including the primary eyeglasses and the auxiliary sunglasses which is much more expensive than simply buying one detachable shelter frame.

In light of the above, it is rather easy to appreciate that both types of conventional auxiliary shelter frames have different problems. The magnetic attachments were originally developed to resolve the clipping claw problem, yet they create other problems as well.

SUMMARY OF THE PRESENT INVENTION

A main object of the present invention is to provide an auxiliary frame for spectacles which comprises a retention arrangement adapted to securely retain the auxiliary frame in position on the spectacles without causing significant destruction thereto.

Another object of the present invention is to provide an auxiliary frame to detachably mount in front of the spectacles, wherein an urging distance between two urging members of the retention arrangement is configured with respect to a lens distance between two lenses of the spectacles such that the two urging members are adapted to apply an urging pressure against two inner sides of the lenses respectively so as to retain the auxiliary frame in position.

Another object of the present invention is to provide an auxiliary frame wherein the retention arrangement rearwardly extends towards the spectacle for non-destructively applying a normal urging force towards the lenses of the spectacle so as to retain the auxiliary frame in position on the relevant spectacle.

Another object of the present invention is to provide an auxiliary frame for mounting on a spectacle, which does not need to alter its original structure and design for fitting that auxiliary frame. In other words, from the user's perspective, the cost for utilizing the auxiliary frame can be minimized.

Another object of the present invention is to provide an auxiliary frame for a spectacle which effectively resolves conventional problems regarding clipping claw or magnetic shelter frame for providing a secure, convenient, compatible and non-destructive auxiliary frame for spectacles.

Another object of the present invention is to provide a spectacle set comprising a spectacle frame and the auxiliary frame securely mounted thereon for providing a reliable and secure shelter for the spectacle.

Accordingly, in order to accomplish the above objects, the present invention provides an auxiliary frame for detachably mounting in front of a spectacle frame which comprises a spectacle bridge connected between two spectacle lenses to define a lens distance between two inner sides of the spectacle lenses, wherein the auxiliary frame comprises:

a mounting frame supporting two shelter lenses for detachably mounting on the spectacle bridge to align the two shelter lenses with the two spectacle lenses respectively when the auxiliary frame is mounted in front of the spectacle frame; and a retention arrangement, comprising:

two guiding members rearwardly extended from two inner sides of the shelter lenses respectively and defined a guiding distance between the two guiding members smaller than the lens distance of the spectacle frame when the auxiliary frame is mounted in front of the spectacle frame; and two urging members provided at rear end portions of the guiding members respectively, wherein an urging distance which is defined between the two urging members is larger than the lens distance of the spectacle frame, such that when the guiding members are extended at the two inner sides of the spectacle lens respectively, the two urging members are adapted for applying an urging force towards the two inner sides of the spectacle lens respectively so as to substantially retain the two shelter lenses in position when the auxiliary frame is mounted in front of the spectacle frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
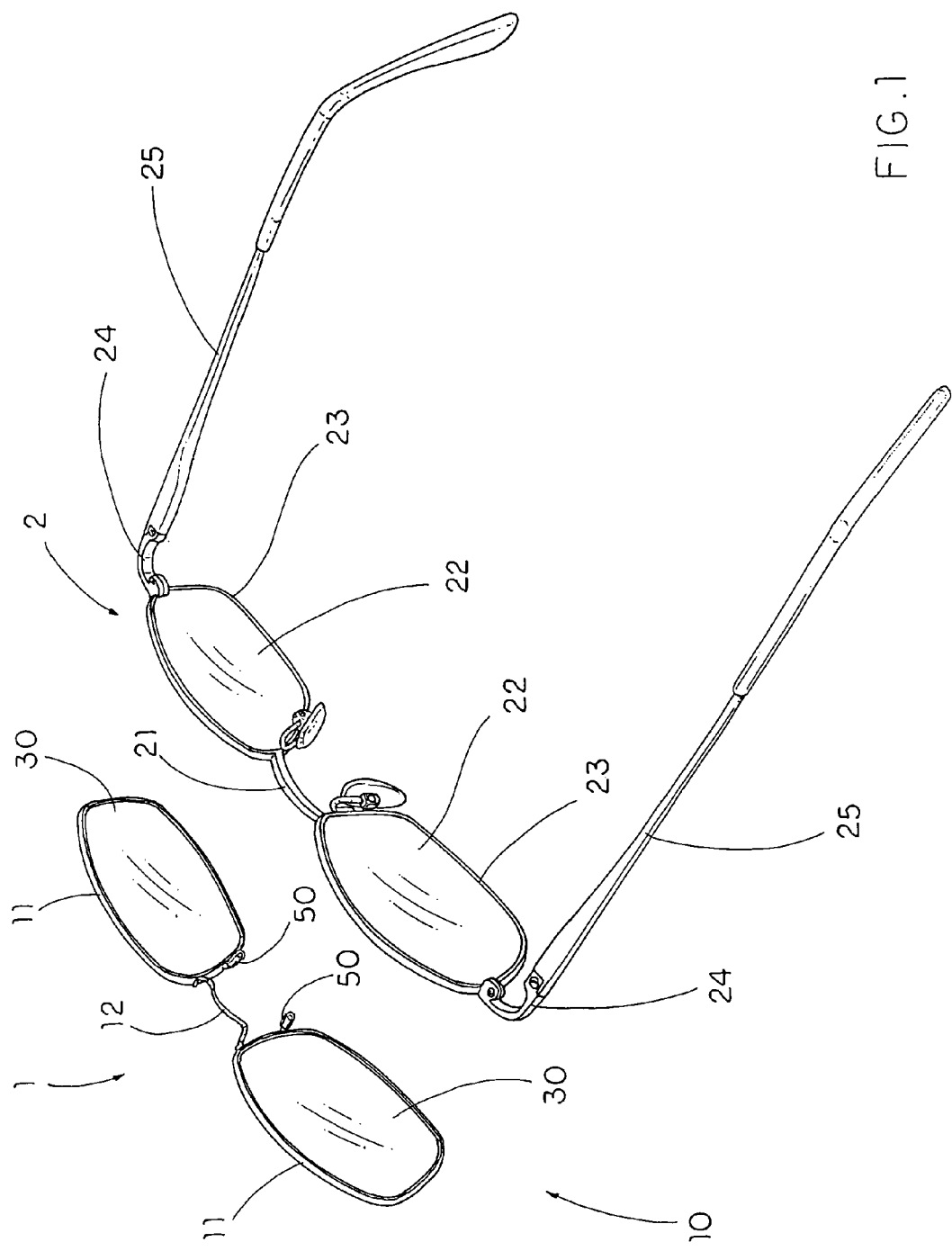
FIG. 1 is an exploded perspective view of the auxiliary frame for a spectacle frame according to a preferred embodiment of the present invention.
Figure 2:
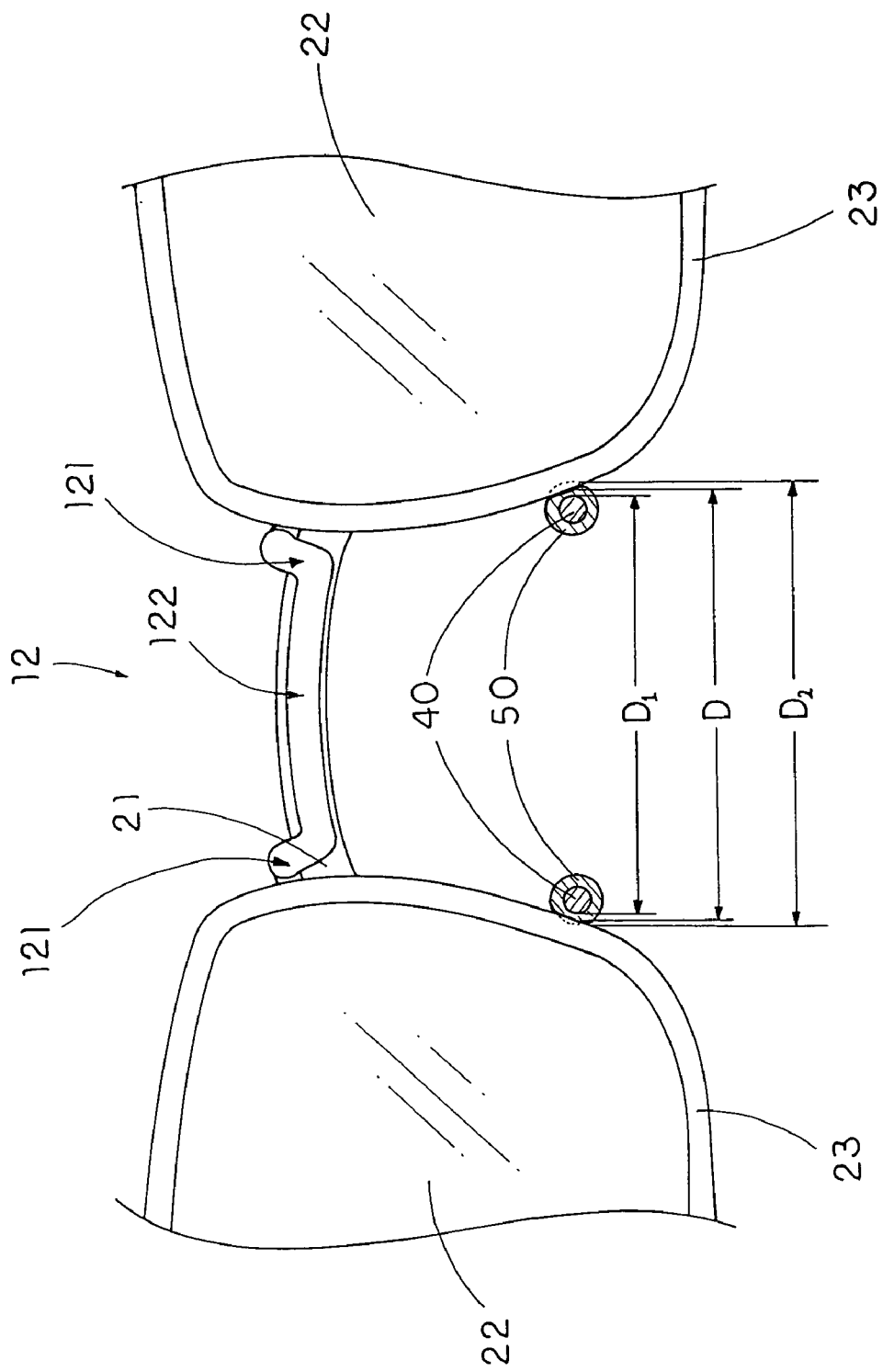
FIG. 2 is a front view of the auxiliary frame mounted in front of the spectacle frame according to the above preferred embodiment of the present invention.
Figure 3:
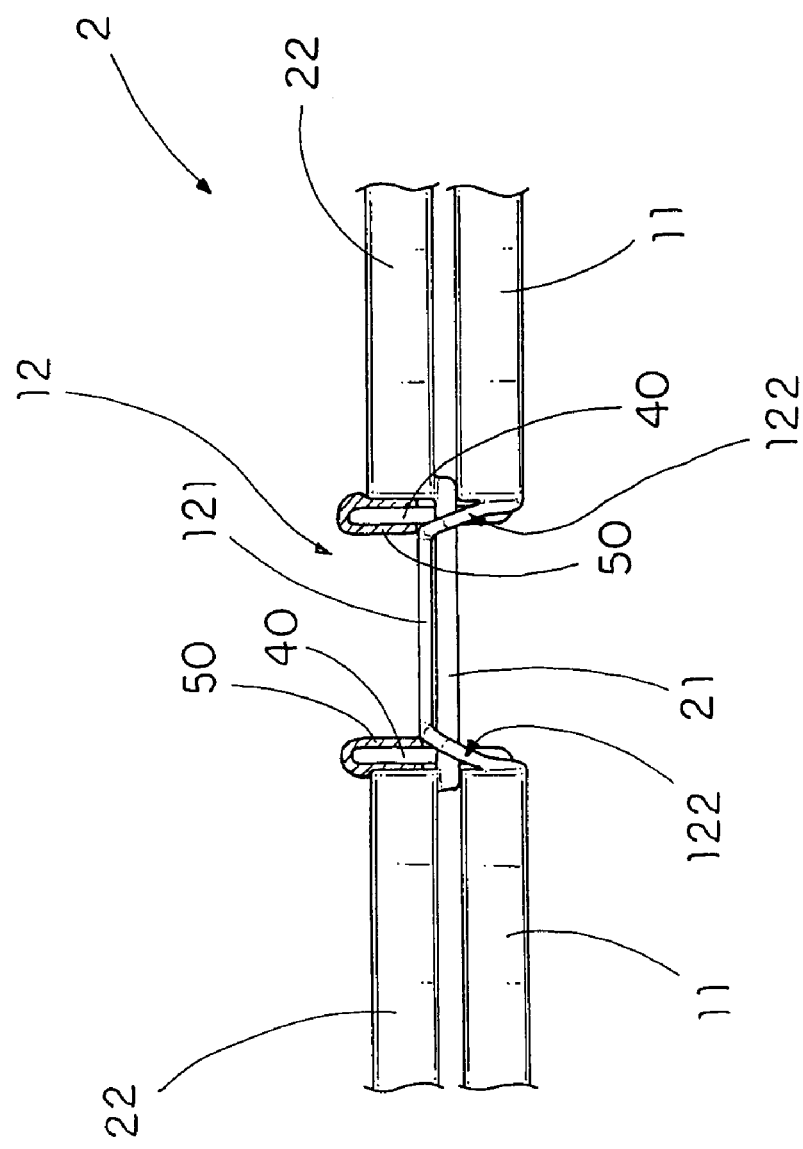
FIG. 3 is a top view of the auxiliary frame mounted in front of the spectacle frame according to the above preferred embodiment of the present invention.

Referring to FIG. 1 to FIG. 3 of the drawings, an auxiliary frame 1 for detachably mounting in front of a spectacle frame 2 comprises a spectacle bridge 21 connected between two inner sides of the spectacle lenses 22 to define a lens distance D between two inner sides of the spectacle lenses 22, wherein the auxiliary frame 1 comprises a mounting frame 10 and a retention arrangement.

The mounting frame 10 supports two shelter lenses 30 for detachably mounting on the spectacle bridge 21 to align the two shelter lenses 30 with the two spectacle lenses 22 respectively when the auxiliary frame 1 is mounted in front of the spectacle frame 2.

The retention arrangement comprises two guiding members 40 rearwardly extended from two inner sides of the shelter lenses 30 respectively and define a guiding distance $D_1$ between the two guiding members 40 which is smaller than the lens distance D of the spectacle frame 2 when the auxiliary frame 1 is mounted in front of the spectacle frame 2.

Furthermore, the retention arrangement further comprises two urging members 50 provided at rear end portions of the guiding members 40 respectively, wherein an urging distance $D_2$, which is defined between the two urging members 50, is larger than the lens distance D of the spectacle frame 2, such that when the guiding members 40 are extended at the two inner sides of the spectacle lenses 22 respectively, the two urging members 50 are adapted for applying an urging force towards the two inner sides of the spectacle lenses 22 respectively so as to substantially retain the two shelter lenses 30 in position when the auxiliary frame 1 is mounted in front of the spectacle frame 2.

Specifically, the two guiding members 40 are preferably embodied as two elongated rigid members respectively, and are rearwardly extended from two lower portions of the shelter lenses 30 for facing towards two lower portions of the spectacle lenses 22 respectively at a position below the spectacle bridge 21 so as to form a secure supporting structure for the auxiliary frame 1 of the present invention.

The mounting frame 10 comprises two lens rims 11 encircling with the shelter lenses 30 respectively and a shelter bridge 12 integrally extending between the lens rims 11 for detachably mounting on the spectacle bridge 21 of the spectacle frame 2, wherein the guiding members 40 are integrally extended from two inner sides of the lens rims 11 towards the inner sides of the spectacle lenses 22 respectively.

Thus, according to the preferred embodiment of the present invention, the two shelter lenses 30 are securely mounted within the lens rims 11 respectively, so that the mounting frame 10 and the shelter lenses 30 are aligned with the spectacle frame 2 and the spectacle lenses 22 respectively.

Furthermore, in order to mount the auxiliary frame 1 on the spectacle frame 2, the shelter bridge 12 is formed as an engaging bridge having two reawardly extending side portions 121 extended from two inner sides of the shelter lenses 30 respectively for supporting on two ends of the spectacle bridge 21 of the spectacle frame 2, and a downwardly curved riding portion 122 extended between the two extending side portions 121 for extending behind the spectacle bridge 21, such that the engaging bridge is adapted for securely riding on the spectacle bridge 21 when the auxiliary frame 1 is mounted in front of the spectacle frame 2.

Referring to FIG. 2 of the drawings, when the shelter bridge 12 is ridden on the spectacle bridge 21, the curved riding portion 122 also downwardly extends to a position below or substantially aligned with the spectacle bridge 21 so as to restrain a frontward movement of the shelter frame 1 with respect to the spectacle frame 2.

The urging members 50, which are made of slightly elastic materials, are encircled at the rear end portions of the guiding members 40. When the auxiliary frame 1 is mounted on the spectacle frame 2, the urging members 50, having the urging distance $D_2$ larger than the lens distance D, are arranged to be slightly squeezed in order to fit into the lens distance D between the two spectacle lenses 22 and, because of their own elasticity, will normally apply an urging force towards two inner sides of the spectacle lenses 22 respectively for minimizing a sideward relative movement between the spectacle frame 2 and the auxiliary frame 1 so as to retain it in position on the spectacle frame 2.

In other words, the urging distance $D_2$ between the two urging members 50 is self-adjusted for fitting with the lens distance D when the two urging members 50 are pressed at the inner sides of the spectacle lenses 22 to sidewardly apply the urging force towards the inner sides thereof respectively so as to substantially retain the auxiliary frame 1 in front of the spectacle frame 2.

It is worth mentioning that since the urging members 50 have a predetermined elasticity sufficient to be slightly squeezed and automatic restoring, therefore, they do not create destructive contact with the inner sides of the spectacle lenses 22 so as to substantially resolve the problem of surface scratching which has frequently presented in conventional clipping claws type shelter frames.

It is important to point out that the above-mentioned embodiment is not intended to be limiting. Some obvious alternatives, such as that shown in FIG. 4 of the drawings, regarding the mounting frame 10' are possible.

Figure 4:
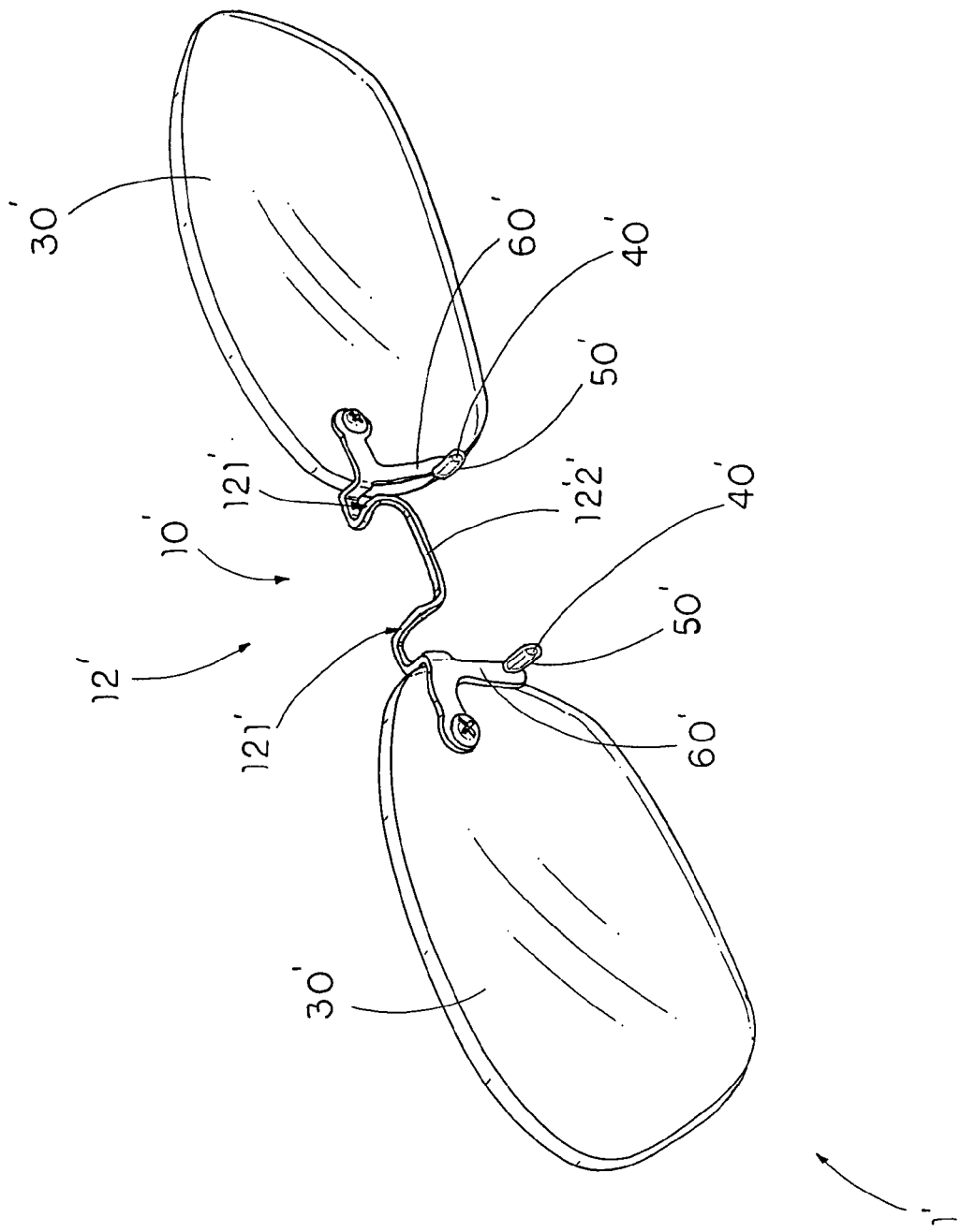
FIG. 4 illustrates an alternative mode of the auxiliary frame according to the above preferred embodiment of the present invention.

Referring to FIG. 4 of the drawings, the retention arrangement further comprises two reinforcing arms 60' integrally extended from the mounting frame 10' to the guiding members 40' to securely fasten at the inner sides of the shelter lenses 30' respectively so as to form the auxiliary frame 1' having a rimless structure, such that the reinforcing arms 60' not only retain the mounting frame 1' in position to support the shelter lenses 30', but also substantially reinforce the two guiding members 40' at the guiding distance $D_1$ therebetween.

As in the preferred embodiment, the shelter bridge 12' is embodied as an engaging bridge having two reawardly extending side portions 121' extended from two inner sides of the shelter lenses 30' respectively for supporting on two ends of the spectacle bridge 21 of the spectacle frame 2', and a downwardly curved riding portion 122' extended between the two extending side portions 121', for extending behind the spectacle bridge 21, such that the engaging bridge is adapted for securely riding on the spectacle bridge 21 when the auxiliary frame 1' is mounted in front of the spectacle frame 2.

Likewise, as shown in FIG. 1 of the drawings, it is also important to remark that the spectacle frame 2 may further comprise two lens frames 23 supporting the two spectacle lenses 22 wherein the spectacle bridge 21 is connecting between the two lens frames 23. Accordingly, the urging members 50 of the retention arrangement are adapted to bias against the inner sides of the respective lens frames 23 so as to retain the position of the shelter frame 1 on the spectacle frame 2.

Figure 5:
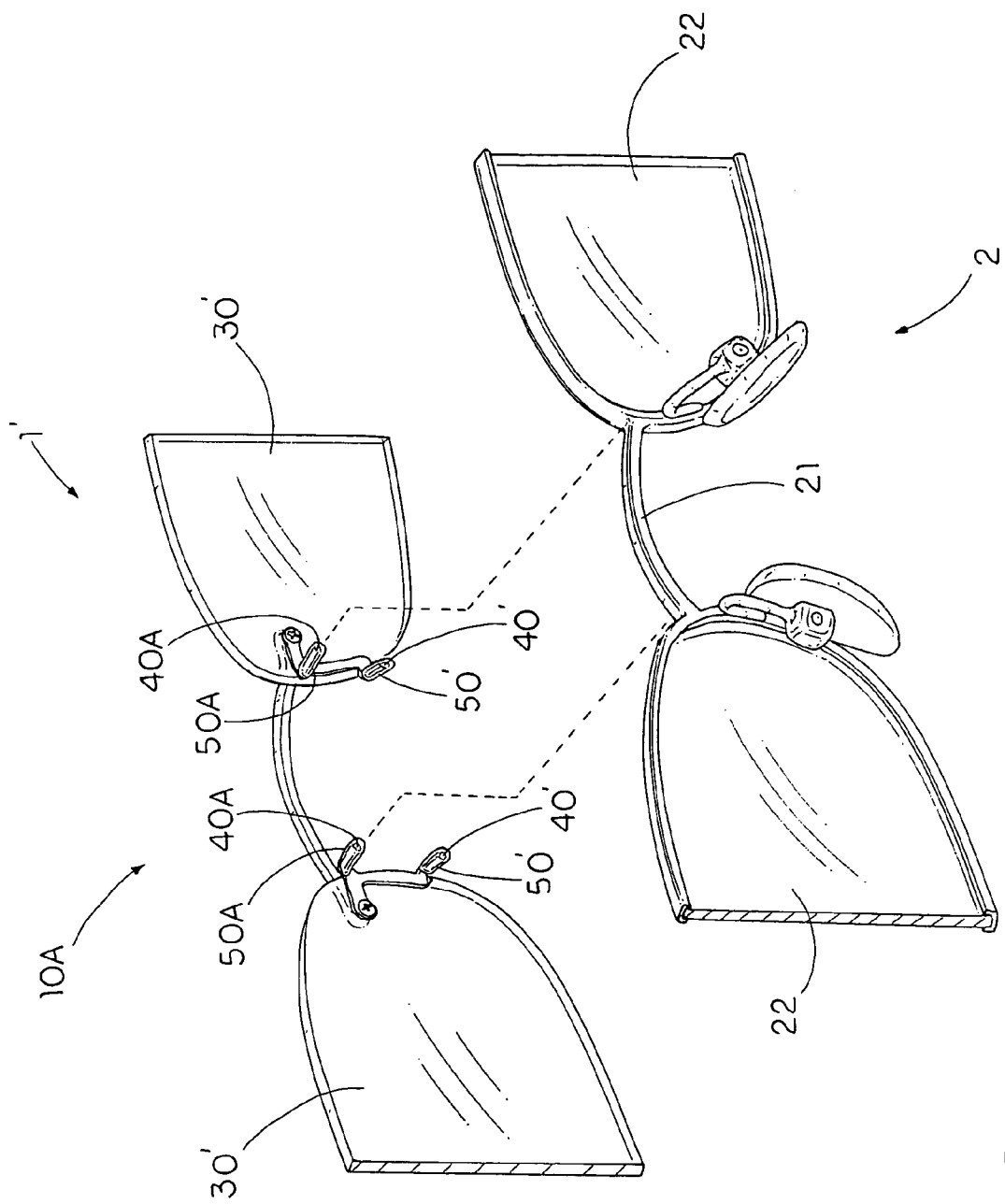
FIG. 5 illustrates a second alternative mode of the mounting frame of the auxiliary frame according to the above preferred embodiment of the present invention.

Referring to FIG. 5 of the drawings, a second alternative mode of the auxiliary frame 1" according to the preferred embodiment of the present invention is illustrated. The alternative mode is similar to that of the preferred embodiment except the mounting frame 10".

The mounting frame 10" comprises an engaging bridge 12" having two extending side portions 121" extended from two inner sides of the shelter lenses 30" respectively for supporting on two ends of the spectacle bridge 21" of the spectacle frame 2, and a L-shaped riding portion 122" extended between the two extending side portions 121" for extending behind the spectacle bridge 21, such that the engaging bridge 12" is adapted for securely riding on the spectacle bridge 21 when the auxiliary frame 1" is mounted in front of the spectacle frame 2.

Likewise, as mentioned in the preferred embodiment, it is also important to remark that the spectacle frame 2 may further comprise two lens frames 23 supporting the two spectacle lenses 22 wherein the spectacle bridge 21 is connecting between the two lens frames 23. Accordingly, the urging members 50 of the retention arrangement are adapted to bias against the inner sides of the respective lens frames 23 so as to retain the position of the shelter frame 1 on the spectacle frame 2.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An auxiliary frame for detachably mounting in front of a spectacle frame which comprises a spectacle bridge connected between two spectacle lenses to define a lens distance between two inner sides of said spectacle lenses, wherein said auxiliary frame comprises:

a mounting frame supporting two shelter lenses for detachably mounting on said spectacle bridge to align said two shelter lenses with said two spectacle lenses respectively when said auxiliary frame is mounted in front of said spectacle frame; and a retention arrangement, comprising:

two guiding members rearwardly extended from two inner sides of said shelter lenses respectively and defined a guiding distance between said two guiding members smaller than said lens distance of said spectacle frame when said auxiliary frame is mounted in front of said spectacle frame; and two urging members provided at rear end portions of said guiding members respectively, wherein an urging distance which is defined between said two urging members is larger than said lens distance of said spectacle frame, such that when said guiding members are extended at said two inner sides of said spectacle lens respectively, said two urging members are adapted for applying an urging force towards said two inner sides of said spectacle lens respectively so as to substantially retain said two shelter lenses in position when said auxiliary frame is mounted in front of said spectacle frame.

2. The auxiliary frame, as recited in claim 1, wherein said two guiding members, which are two elongated rigid members respectively, are rearwardly extended from two lower portions of said shelter lenses for facing towards two lower portions of said spectacle lenses respectively at a position below said spectacle bridge.

3. The auxiliary frame, as recited in claim 2, wherein said urging members, which are made of elastic materials, and are encircled around said rear end portions of said guiding members, wherein said urging distance between said two urging members is self-adjusted for fitting with said lens distance when said two urging members are pressed at said inner sides of said spectacle lenses to sidewardly apply said urging force against said inner sides thereof respectively so as to substantially retain said auxiliary frame in front of said spectacle frame.

4. The auxiliary frame, as recited in claim 1, wherein said urging members, which are made of elastic materials, and are encircled around said rear end portions of said guiding members, wherein said urging distance between said two urging members is self-adjusted for fitting with said lens distance when said two urging members are pressed at said inner sides of said spectacle lenses to sidewardly apply said urging force against said inner sides thereof respectively so as to substantially retain said auxiliary frame in front of said spectacle frame.

5. The auxiliary frame, as recited in claim 1, wherein said retention arrangement further comprises two reinforcing arms integrally extended from said mounting frame to said guiding members to securely fasten at said inner sides of said shelter lenses respectively so as to form said auxiliary frame having a rimless structure, such that said reinforcing arms not only retain said mounting frame in position to support said shelter lenses but also substantially reinforce said two guiding members at said guiding distance therebetween.

6. The auxiliary frame, as recited in claim 5, wherein said two guiding members, which are two elongated rigid members respectively, are rearwardly extended from two lower portions of said shelter lenses for facing towards two lower portions of said spectacle lenses respectively at a position below said spectacle bridge.

7. The auxiliary frame, as recited in claim 6, wherein said urging members, which are made of elastic materials, and are encircled around said rear end portions of said guiding members, wherein said urging distance between said two urging members is self-adjusted for fitting with said lens distance when said two urging members are pressed at said inner sides of said spectacle lenses to sidewardly apply said urging force against said inner sides thereof respectively so as to substantially retain said auxiliary frame in front of said spectacle frame.

8. The auxiliary frame, as recited in claim 5, wherein said urging members, which are made of elastic materials, and are encircled around said rear end portions of said guiding members, wherein said urging distance between said two urging members is self-adjusted for fitting with said lens distance when said two urging members are pressed at said inner sides of said spectacle lenses to sidewardly apply said urging force against said inner sides thereof respectively so as to substantially retain said auxiliary frame in front of said spectacle frame.

9. The auxiliary frame, as recited in claim 1, wherein said mounting frame comprises two lens rims encircling with said shelter lenses respectively, wherein said mounting frame is integrally extended between said lens rims for detachably mounting on said spectacle bridge of said spectacle frame, wherein said guiding members are integrally extended from two inner sides of said lens rims towards said inner sides of said spectacle lenses respectively.

10. The auxiliary frame, as recited in claim 9, wherein said two guiding members, which are two elongated rigid members respectively, are rearwardly extended from two lower portions of said shelter lenses for facing towards two lower portions of said spectacle lenses respectively at a position below said spectacle bridge.

11. The auxiliary frame, as recited in claim 10, wherein said urging members, which are made of elastic materials, and are encircled around said rear end portions of said guiding members, wherein said urging distance between said two urging members is self-adjusted for fitting with said lens distance when said two urging members are pressed at said inner sides of said spectacle lenses to sidewardly apply said urging force against said inner sides thereof respectively so as to substantially retain said auxiliary frame in front of said spectacle frame.

12. The auxiliary frame, as recited in claim 9, wherein said urging members, which are made of elastic materials, and are encircled around said rear end portions of said guiding members, wherein said urging distance between said two urging members is self-adjusted for fitting with said lens distance when said two urging members are pressed at said inner sides of said spectacle lenses to sidewardly apply said urging force against said inner sides thereof respectively so as to substantially retain said auxiliary frame in front of said spectacle frame.

13. A spectacle set comprising a spectacle frame and an auxiliary frame detachably mounting in front of said spectacle frame;
  said spectacle frame supporting two spectacle lenses and comprising a spectacle bridge connected between said two spectacle lenses to define a lens distance between two inner sides of said spectacle lenses;
  said auxiliary frame, comprising:
  a mounting frame supporting two shelter lenses to detachably mount on said spectacle bridge to align said two shelter lenses with said two spectacle lenses respectively when said auxiliary frame is mounted in front of said spectacle frame; and
  a retention arrangement, comprising:
  two guiding members rearwardly extended from two inner sides of said shelter lenses respectively and defined a guiding distance between said two guiding members smaller than said lens distance of said spectacle frame when said auxiliary frame is mounted in front of said spectacle frame; and
  two urging members provided at rear end portions of said guiding members respectively, wherein an urging distance which is defined between said two urging members is larger than said lens distance of said spectacle frame, such that when said guiding members are extended at said two inner sides of said spectacle lens respectively, said two urging members are adapted for applying an urging force towards said two inner sides of said spectacle lens respectively so as to substantially retain said two shelter lenses in position when said auxiliary frame is mounted in front of said spectacle frame.

14. The spectacle set, as recited in claim 13, wherein said two guiding members, which are two elongated rigid members respectively, are rearwardly extended from two lower portions of said shelter lenses to face towards two lower portions of said spectacle lenses respectively at a position below said spectacle bridge.

15. The spectacle set, as recited in claim 14, wherein said urging members, which are made of elastic materials, and are encircled around said rear end portions of said guiding members, wherein said urging distance between said two urging members is self-adjusted to fit with said lens distance when said two urging members are pressed at said inner sides of said spectacle lenses to sidewardly apply said urging force against said inner sides thereof respectively so as to substantially retain said auxiliary frame in front of said spectacle frame.

16. The spectacle set, as recited in claim 13, wherein said retention arrangement further comprises two reinforcing arms integrally extended from said mounting frame to said guiding members to securely fasten at said inner sides of said shelter lenses respectively so as to form said auxiliary frame having a rimless structure, such that said reinforcing arms not only retain said mounting frame in position to support said shelter lenses but also substantially reinforce said two guiding members at said guiding distance therebetween.

17. The spectacle set, as recited in claim 16, wherein said urging members, which are made of elastic materials, and are encircled around said rear end portions of said guiding members, wherein said urging distance between said two urging members is self-adjusted to fit with said lens distance when said two urging members are pressed at said inner sides of said spectacle lenses to sidewardly apply said urging force against said inner sides thereof respectively so as to substantially retain said auxiliary frame in front of said spectacle frame.

18. The spectacle set, as recited in claim 13, wherein said mounting frame comprises two lens rims encircling with said shelter lenses respectively, wherein said mounting frame is integrally extended between said lens rims to detachably mount on said spectacle bridge of said spectacle frame, wherein said guiding members are integrally extended from two inner sides of said lens rims towards said inner sides of said spectacle lenses respectively.

19. The spectacle set, as recited in claim 18, wherein said urging members, which are made of elastic materials, and are encircled around said rear end portions of said guiding members, wherein said urging distance between said two urging members is self-adjusted to fit with said lens distance when said two urging members are pressed at said inner sides of said spectacle lenses to sidewardly apply said urging force against said inner sides thereof respectively so as to substantially retain said auxiliary frame in front of said spectacle frame.

20. The spectacle set, as recited in claim 13, wherein said mounting frame comprises an engaging bridge having two reawardly extending side portions extended from two inner sides of said shelter lenses respectively to support on two ends of said spectacle bridge of said spectacle frame and a downwardly curved riding portion extended between two extending side portions to extend behind said spectacle bridge, such that said engaging bridge is securely ridden on said spectacle bridge when said auxiliary frame is mounted in front of said spectacle frame.

21. The spectacle set, as recited in claim 20, wherein said urging members, which are made of elastic materials, and are encircled around said rear end portions of said guiding members, wherein said urging distance between said two urging members is self-adjusted to fit with said lens distance when said two urging members are pressed at said inner sides of said spectacle lenses to sidewardly apply said urging force against said inner sides thereof respectively so as to substantially retain said auxiliary frame in front of said spectacle frame.

* * * * *